United States Patent Office 3,116,313
Patented Dec. 31, 1963

3,116,313
PREPARATION OF AROMATIC NITRILES BY CATALYZED REACTION OF ARYL HALIDE WITH HYDROGEN CYANIDE OR CYANOGEN
William L. Fierce, Crystal Lake, and Walter J. Sandner, Carpentersville, Ill., assignors to The Pure Oil Company, Chicago, Ill., a corporation of Ohio
No Drawing. Filed July 1, 1960, Ser. No. 40,179
20 Claims. (Cl. 260—465)

This invention relates to new and useful improvements in processes for the preparation of aromatic nitriles by the reaction of aromatic and alkyl-substituted aromatic compounds, having one or more halogens substituted in the aromatic ring, with cyanogen or hydrogen cyanide at elevated temperatures in the presence of a catalyst consisting of a group VIII noble metal on a refractory high-surface-area support.

Benzonitrile is a well known organic compound which is useful as an intermediate in the preparation of a variety of organic compounds. The phthalonitriles are also well known organic compounds which are useful intermediates in the preparation of polyester resins. The nitrile derivatives of other aromatic hydrocarbons, e.g., napthonitrile, anthraconitrile, dicyanodiphenyl, etc., are also useful intermediates in the preparation of other nitrogenous compounds and in the preparation of aromatic acids. Merz and Weith reported in Ber., 10, 753 (1877), that cyanogen and benzene react when passed through a hot tube (glowing faintly red) to form benzonitrile and terephthalonitrile in very small amounts, as well as small amounts of diphenyl. G. J. Janz, in J. Am. Chem. Soc., 74, 4529 (1952), reported work on the reaction of cyanogen with benzene in the gas phase, at atmospheric pressure and temperatures above 500° C. In Janz's work no catalysts were used. At 500° C., using an equimolar ratio of the reactants, Janz produced only traces of benzonitrile. At 650° C., the yields were still quite small. At 745° C. and 2–3 seconds contact time, using a twofold excess of cyanogen in the feed, the yield of benzonitrile was as high as 42%, calculated on benzene conversion per pass. Some (1–5%) phthalonitriles where also obtained in the reaction product. Janz investigated the use of silica chips, pumice chips, and cobalt oxide on alumina as possible catalysts, all of which were stated to be ineffective. Janz also stated that if benzene is used in excess, diphenyl is also formed. J. N. Cosby, in U.S. Patent 2,449,643, reports the production of benzonitrile by a high-temperature reaction of hydrogen cyanide with benzene or with diphenyl. In the Cosby patent, it is reported that mixtures of benzene or diphenyl and hydrogen cyanide react at temperatures in the range from 500° to 1100° C. Cosby reports that the reaction may be carried out in the presence or absence of catalysts and states that no provision need be made for catalyzing the reaction. In the absence of catalysts, is stated that the reaction proceeds at adequate rates at temperatures above 750° C., although it is preferred to heat the reactants to temperatures of about 900°–950° C. Cosby indicates that in the presence of catalysts, lower temperatures may be employed, but no catalysts are disclosed to be useful in this process.

It is one object of this invention to provide a new and improved process for the preparation of aryl nitriles by the catalyzed, high-temperature reaction of hydrogen cyanide or cyanogen with halogenated aromatic hydrocarbons in which the halogen is present as a substituent on the aromatic ring.

A feature of this invention is the provision of an improved process for the preparation of aryl nitriles in which a halogenated aromatic hydrocarbon is reacted with cyanogen or hydrogen cyanide at an elevated temperature in the presence of a catalyst consisting essentially of a group VIII noble metal on a refractory high-surface area support.

Another feature of this invention is the provision of a process for the preparation of aromatic nitriles by reaction of a halogenated aromatic hydrocarbon with hydrogen cyanide or cyanogen at temperatures in the range from about 400° to 1000° C. in the presence of a catalyst consisting essentially of a group VIII noble metal on a refractory high-surface-area support (preferably a high-surface-area refractory oxide).

Other objects and features of this invention will become apparent from time to time throughout the specification and claims as hereinafter related.

This invention is based upon our discovery that aromatic nitriles can be produced by reaction of aromatic hydrocarbons having one or more halogen substituents on the aromatic nucleus with hydrogen cyanide or cyanogen at temperatures in the range of about 400° to 1000° C. in the presence of a catalyst consisting of a group VIII noble metal on a refractory high-surface-area support. The support used is preferably a high-surface-area, refractory oxide, such as activated alumina, silica-alumina cracking catalysts, etc., having surface areas in excess of about 10 sq. m./g. The proportion of the group VIII metal (viz., platinum, palladium, ruthenium, iridium, osmium, rhodium) is not critical, but for purposes of economy is preferably in the range from about 0.05 to 5.0% wt. The high-surface-area, refractory oxides have some catalytic properties when used alone, but for full effectiveness the catalyst must contain a small amount of the group VIII noble metal. Within the aforementioned range of temperatures, hydrogen cyanide and cyanogen react with halogenated aromatic compounds (including alkyl-substituted aromatic hydrocarbons), such as chlorobenzene, dichlorobenzene, bromobenzene, dibromobenzene, tribromobenzene, chloronaphthalene, bromonaphthalene, dibromonaphthalene, chlorodiphenyl, dichlorodiphenyl, iodobenzene, chloroanthracene, chlorophenanthrene, bromotoluene, bromoxylene, bromomesitylene, ocytl chlorobenzene, butyl chloronapthalene. The halogenated aromatic hydrocarbon must contain a halogen substituent in the aromatic nucleus. Within the aforementioned range of temperatures using the above-described catalysts, reaction takes place in which a cyanide radical is substituted for the halogen on the aromatic hydrocarbon and an aromatic nitrile is thus obtained. When a polyhalogenated aromatic hydrocarbon is used as a reactant, e.g., dichlorobenzene, dibromonaphthalene, diiodoanthracene, etc., a moderate yield of dicyanoaromatic compounds is obtained.

This reaction proceeds well at atmospheric pressure, although it may be carried out at either subatmospheric or superatmospheric pressures. In carrying out this reaction, the preferred mol ratio of reactants is in the range from 0.1 to 10 mols of halogenated aromatic hydrocarbon per mol of hydrogen cyanide or cyanogen. The reaction gases may be passed through the reaction zone at a gaseous hourly space velocity of approximately 50–2000, with a space velocity of 150–600 being preferred. In this process, the term "space velocity" refers to the ratio of the volume of the reactant gases (at standard temperature and pressure) charged per hour to the volume of the reaction space.

In carrying out this process, the halogenated aromatic hydrocarbon and the hydrogen cyanide or cyanogen may be premixed and preheated, or may be separately charged to the catalyst-containing reaction zone, which is maintained at the desired reaction temperature. Any type of reactor may be used which is resistant to attack by the reactants or by the reaction products. Quartz, high-silica glass, stainless steel, or other refractory and corrosion-resistant materials may be used. The reactor may be heated by any suitable means, such as combustion gases applied externally, or may be heated by external or internal electric means, including resistance heaters and induction heaters, or by heating tubes extending through the reactor. Another method of heating, which has been developed in recent years and which is particularly useful in this process is the use of hot refractory pebbles, which are intermittently heated to the desired reaction temperatures.

The product gases from the reaction zone consist of a mixture of aromatic nitriles, unreacted hydrogen cyanide, or cyanogen, and halogenated aromatic hydrocarbon reactant, by-product hydrogen chloride, and unidentified by-product gases. These reaction gases are withdrawn from the reaction zone and cooled to a temperature sufficiently low to condense the product nitriles. The product which is condensed from the reaction gases ordinarily has to be fractionated or purified by other suitable means, e.g., fractional crystallization or solvent extraction, to obtain pure aromatic nitrile products. The unreacted halogenated aromatic hydrocarbon and/or hydrogen cyanide, or cyanogen, may be recycled to the reaction zone with additional quantities of reactants for further reaction. In the experiments which were carried out, samples of the charge and product gases were analyzed by the mass spectrometer and liquid products were analyzed by infra-red spectroscopy.

The following non-limiting examples are illustrative of the scope of this invention.

EXAMPLE I

An attempt was made to effect the reaction of cyanogen with chlorobenzene at elevated temperatures. A mixture of cyanogen and helium diluent was introduced into a Vycor (high-silica glass) tube which was electrically heated to the desired temperature, and was mounted in a vertical position. Chlorobenzene was vaporized directly into the reaction tube. At temperatures in the range from 500° to 1000° C., it was found that there is no appreciable reaction in which benzonitrile is formed and chlorine eliminated from the aromatic ring.

A vertically-mounted, electrically-heated reactor tube of Vycor high-silica glass was charged with a catalyst consisting of (Alcoa F-10) activated alumina. The Vycor tube was heated to the desired reaction temperature and a gaseous mixture of cyanogen and helium introduced thereto. Chlorobenzene was vaporized directly into the reactor tube for the reaction. Liquid products obtained were analyzed by infra-red spectroscopy, while samples of the charge and product gases from each run were taken and analyzed by the mass spectrometer. At a reaction temperature of 490°–509° C., using a chlorobenzene/cyanogen mol ratio of 1.47 and a gaseous hourly space velocity of 384 for a period of 20 minutes, there was a conversion of 23.4% of the cyanogen and less than 1% of the chlorobenzene. Benzonitrile was obtained in a molar yield per pass of 0.3%, based on cyanogen charged, representing a selectivity of 1.3%, based on cyanogen consumed.

In a second run using this apparatus and catalyst, at a chlorobenzene/cyanogen mol ratio of 1.25, a reaction-zone temperature of 605°–612° C., and a gaseous hourly space velocity of 386 for about 20 minutes, there was a 64.6% conversion of cyanogen and a 14% conversion of chlorobenzene. Benzonitrile was obtained in a molar yield per pass of 1.90%, based on cyanogen charged, representing a selectivity of 2.95%, based on cyanogen consumed in the reaction.

EXAMPLE II

In another series of experiments, using the apparatus of Example I, the reaction tube was filled with a catalyst consisting of activated alumina containing 0.5% wt. rhodium. The catalyst used in these runs was predried over-night at 500°–600° C. before carrying out the experiment. Cyanogen, chlorobenzene, and helium diluent were charged, as in Example I, to the reactor tube at a chlorobenzene/cyanogen mol ratio of 0.99. The reactor tube was maintained at a temperature of 526–530° C. and the reactants were passed therethrough at a gaseous hourly space velocity of 402 for a period of 30 minutes. In this run, there was a 28.0% conversion of cyanogen and a 33.2% conversion of chlorobenzene. Benzonitrile was obtained in a yield of 14.7%, based on the cyanogen charged, and a selectivity of 52.7%, based on cyanogen consumed in the reaction. There were also obtained yields of 1.17% terephthalonitrile, 1.12% isophthalonitrile, and 0.2% orthophthalonitrile, based on the cyanogen charged, representing a total selectivity for formation of phthalonitriles of about 9%, based on the cyanogen consumed.

In another run, using the same apparatus and catalyst, chlorobenzene, cyanogen, and helium diluent were charged to the reactor tube at a chlorobenzene/cyanogen mol ratio of 1.39. The reactor tube was maintained at 608°–612° C. and the reactants were passed therethrough at a gaseous hourly space velocity of 447 for a period of 30 minutes. In this run, there was a 76.6% conversion of cyanogen and a 59.1% conversion of chlorobenzene. Benzonitrile was obtained in a yield per pass of 38.6%, based on cyanogen charged to the reactor, representing a selectivity of 50.4%, based on cyanogen consumed in the reaction. Phthalonitriles were also formed in substantial yield; there was a 3.8% yield of terephthalonitrile, 7.4% yield of isophthalonitrile, and 1.77% yield of orthophthalonitrile. The quantity of phthalonitrile obtained represented a selectivity for formation of phthalonitriles slightly in excess of 17%. From these runs, it is seen that the reaction of cyanogen with chlorobenzene is one which requires a catalyst and it is only when a catalyst is used which consists of a group VIII noble metal, e.g., rhodium, on a refractory support, preferably a high-surface-area refractory material, such as activated alumina, that substantial yields of aromatic nitriles are obtained.

EXAMPLE III

When hydrogen cyanide was substituted for cyanogen in this process, benzonitrile was obtained in good yields. In a series of experiments hydrogen cyanide and chlorobenzene were passed through a reactor tube charged with catalyst as in the previous examples. The results of these runs are set forth in the following table.

*Table I*

| Run No. | A | B | C | D |
|---|---|---|---|---|
| Temperature (° C.) | 486–504 | 593–604 | 491–502 | 579–598 |
| Duration in Minutes | 40 | 40 | 40 | 40 |
| Gaseous Hourly Space Velocity of Total Charge Gas | 494 | 515 | 504 | 526 |
| Mol Ratio of $C_6H_5Cl/HCN$ | 2.34 | 2.12 | 2.09 | 2.08 |
| Percent HCN Consumed | 22.0 | 32.3 | 37.0 | 29.6 |
| Percent $C_6H_5Cl$ Consumed | 1.8 | 3.6 | 21.5 | 20.5 |
| Molar Yield per Pass of Benzonitrile: | | | | |
| Based on HCN charged | 0.94 | 0.82 | 20.3 | 23.5 |
| Based on $C_6H_5Cl$ charged | 0.40 | 0.39 | 9.7 | 8.8 |
| Molar Selectivity of Benzonitrile: | | | | |
| Based on HCN consumed | 4.25 | 2.56 | 55.0 | 80.0 |
| Based on $C_6H_5Cl$ consumed | 22.2 | 10.8 | 45.3 | 43.0 |
| Catalyst Used | Alumina (F–10) | | 0.5% Rhodium on Alumina | |

EXAMPLE IV

When chlorotoluene is substituted for chlorobenzene in the reaction of the previous examples, using either cyanogen or hydrogen cyanide as the reactant and rhodium on activated alumina as the catalyst, methylbenzonitrile is obtained in good yield as a principal reaction product.

EXAMPLE V

In another series of experiments, cyanogen and o-dichlorobenzene were passed through a reactor tube charged with catalyst (0.5% Rh on $Al_2O_3$) as in the previous examples. The results of these runs are set forth in the following table.

Table II

| Run No. | E | F |
| --- | --- | --- |
| Duration of Run (Minutes) | 40 | 40 |
| Temperature (° C.) | 491-508 | 598-618 |
| Mol Ratio $(CN)_2/C_6H_4Cl_2$ | 2.6 | 2.2 |
| Gaseous Hourly Space Velocity | 526 | 547 |
| Percent Cyanogen Converted | 7.8 | 23.8 |

The liquid products were analyzed by the infra-red spectrophotometer and o-phthalonitrile was found to be a major constituent in the products of both runs. Quantitative analyses could not be made because of unidentified interfering substances. Infra-red analysis also indicated the presence of terephthalonitrile and a cyano-substituted monochlorobenzene.

This reaction is effective using any Group VIII noble metal catalyst supported on a refractory oxide or other refractory support, preferably a high-surface-area refractory material, such as activated alumina, and hydrogen cyanide or cyanogen at temperatures in the range of 400° to 1000° C.

When other halogenated aromatic hydrocarbons are substituted for chlorobenzene in this process, the corresponding aromatic nitriles are obtained. Thus, when chloronaphthalene, chloroanthracene, chlorophenanthrene, chlorodiphenyl, or dichlorodiphenyl are substituted for chlorobenzene in the apparatus described in the above examples, good yields of the corresponding nitriles are obtained upon reaction with cyanogen or hydrogen cyanide at temperatures of 400°–1000° C., in the presence of a catalyst consisting of a group VIII noble metal, viz., rhodium, platinum, palladium, ruthenium, osmium, or iridium, on activated alumina or other refractory supports. When other halogenated aromatic hydrocarbons are used in this reaction, the corresponding nitriles are obtained. Thus, when iodobenzene, or bromobenzene is substituted for chlorobenzene in the reaction, benzonitrile is obtained as a product. Similarly, the chlorinated, brominated, or iodated hydrocarbons may be used in carrying out the reaction between a halogenated anthracene, phenanthrene, diphenyl, or alkyl derivatives thereof. When a halogenated aromatic hydrocarbon is used as a reactant in this process, the halogen must be a substituent on the aromatic ring, rather than on the alkyl side-chain. Halogenated aromatic hydrocarbons containing one or more alkyl side-chains ranging from 1 to 8 carbon atoms per alkyl group are useful in this process. Halogenated aromatic hydrocarbons containing longer alkyl side-chains are effective to a limited extent, but are less convenient to use in this process due to their low volatility. When a halogenated aromatic hydrocarbon is used as a reactant which contains more than one halogen atom per molecule, viz., dichlorobenzene, trichlorobenzene, tetrachlorobenzene, dichloronaphthalene, dichloroanthracene, hexachloroanthracene, dichlorodiphenyl, dichlorotoluene, octyl dichlorobenzene, hexachlorobenzene, etc., products are obtained containing more than one cyanogen group per molecule. In the case of aromatic hydrocarbons containing 2 or 3 halogens per molecule, the product obtained is one in which a cyanide radical has substituted for each of the halogens. In compounds containing a larger number of halogens, products are obtained containing both halogen and cyanide groups and in some cases nitriles are obtained which are decomposition products, or polymers, or condensation products, of the halogenated aromatic hydrocarbons.

While we have described our invention fully and completely with special emphasis upon several preferred embodiments, we wish it to be understood that other reaction conditions may be employed within the scope of the appended claims. For example, the catalysts which may be used in this process include high-surface-area refractory oxides, such as activated alumina, silica-alumina cracking catalysts, silica gel, and other refractory mixed oxides having surface areas in excess of 10 sq. m./g., having supported thereon 0.05–5.0% wt. (preferably about 0.5% wt.) of a group VIII noble metal, based on the weight of the catalyst support. The reaction between cyanogen or hydrogen cyanide and the halogenated aromatic hydrocarbon takes place in the range from about 400° to 1000° C., using these catalysts. Generally, the preferred temperature range is about 500°–600° C., but this may vary, depending upon the particular catalysts used, the ratio of reactants, and the particular halogenated hydrocarbon. As previously indicated, halogenated aromatic hydrocarbons which are used include chlorinated, iodated, and brominated, aromatic hydrocarbons having 1 to 3 aromatic rings (with or without alkyl side-chains). The halogenated aromatic hydrocarbon and cyanogen or hydrogen cyanide react generally under the conditions of this process in almost any mixture, provided that the proper catalyst and reaction temperature are selected. Generally, the preferred ratio of reactants used varies from 0.1 to 10 mols of halogenated hydrocarbon to one of hydrogen cyanide or cyanogen. When cyanogen is used as a reactant, there is also some formation of polymeric compounds. Thus, the reaction of cyanogen with chlorobenzene may produce some diphenyl as a by-product, and also nitrile derivatives of diphenyl. The reactants may be fed at a gaseous hourly space velocity ranging from 50 to 2000, or higher, although rates of feed outside this range may be used if desired. At very low feed rates, e.g., less than 50, yields are somewhat lower due to decomposition of reactants in the reaction zone. At very high space velocities, the reaction rate is low due to the very low residence time in the reactor. It is apparent, therefore, that this reaction is not completely inoperative when the reactants are fed at space velocities outside the preferred range, although the range of 50 to 2000 is preferred. Because of the very high temperature at which this reaction is carried out, it is preferred that the process be operated at atmospheric or a very slight superatmospheric pressure, e.g., 15–20 p.s.i.a. If proper apparatus is selected, this process may be carried out at lower or higher pressures as may appear to be appropriate for the particular reactants, catalysts, and reaction temperature.

The embodiments of the invention in which an exclusive property or privilege is claimed are defined as follows.

We claim:

1. A method of preparing aromatic nitriles which comprises reacting a halogenated aromatic hydrocarbon selected from the group consisting of benzene, naphthalene, anthracene, phenanthrene, diphenyl, and $C_1$–$C_8$ alkyl derivatives thereof, containing at least one halogen substituent, selected from the group consisting of chlorine, bromine, and iodine, on the aromatic nucleus, with a cyanide compound selected from the group consisting of cyanogen and hydrogen cyanide at a temperature of 400°–1000° C. in the presence of a catalyst consisting of a refractory support containing at least about 0.05% wt. of a group VIII noble metal.

2. A method according to claim 1 in which the cyanide compound is cyanogen.

3. A method according to claim 1 in which the cyanide compound is hydrogen cyanide.

4. A method according to claim 1 in which the catalyst consists of a refractory oxide containing 0.05–5.0% wt. of the group VIII noble metal.

5. A method according to claim 1 in which the mol ratio of halogenated hydrocarbon to cyanide compound is in the range from about 0.1 to 10.

6. A method according to claim 1 in which the gaseous hourly space velocity of reactants is about 50–2000.

7. A method according to claim 4 in which the catalyst comprises rhodium on activated alumina.

8. A method according to claim 4 in which the catalyst comprises platinum on activated alumina.

9. A method according to claim 4 in which the catalyst comprises palladium on activated alumina.

10. A method according to claim 4 in which the catalyst comprises osmium on activated alumina.

11. A method according to claim 4 in which the catalyst comprises iridium on activated alumina.

12. A method according to claim 4 in which the catalyst comprises ruthenium on activated alumina.

13. A method according to claim 4 in which the halogenated hydrocarbon is a monohalobenzene.

14. A method according to claim 4 in which the halogenated hydrocarbon is a monohalonaphthalene.

15. A method according to claim 4 in which the halogenated hydrocarbon is a monohaloanthracene.

16. A method according to claim 4 in which the halogenated hydrocarbon is a monohalophenanthrene.

17. A method according to claim 4 in which the halogenated hydrocarbon is a monohalotoluene.

18. A method according to claim 4 in which the halogenated hydrocarbon is a monohalodiphenyl.

19. A method according to claim 4 in which the halogenated hydrocarbon is a dihalobenzene.

20. A method of preparing benzonitrile which comprises reacting chlorobenzene with cyanogen at 500°–600° C. in the presence of a catalyst consisting of activated alumina containing about 0.05–5.0% wt. of rhodium.

References Cited in the file of this patent

UNITED STATES PATENTS

| | | |
|---|---|---|
| 2,591,415 | Engelhardt et al. | Apr. 1, 1952 |
| 2,716,646 | Willett et al. | Aug. 30, 1955 |

OTHER REFERENCES

Ephraim: "Inorganic Chemistry" (edited by Thorne et al.), fourth edition, revised; 1943, page 208.